US011658505B2

United States Patent
Paciura et al.

(10) Patent No.: US 11,658,505 B2
(45) Date of Patent: May 23, 2023

(54) HYBRID UNIVERSAL LOAD CONDITIONER

(71) Applicant: Cummins Power Generation Ltd. (UK), Ramsgate (GB)

(72) Inventors: Krzysztof Paciura, Peterborough (GB); Emil Ernest, Stamford (GB)

(73) Assignee: Cummins Power Generation Ltd. (UK), Ramsgate (GB)

( * ) Notice: Subject to any disclaimer, the term of this patent is extended or adjusted under 35 U.S.C. 154(b) by 420 days.

(21) Appl. No.: 16/757,235

(22) PCT Filed: Oct. 18, 2018

(86) PCT No.: PCT/IB2018/058117
§ 371 (c)(1),
(2) Date: Apr. 17, 2020

(87) PCT Pub. No.: WO2019/077554
PCT Pub. Date: Apr. 25, 2019

(65) Prior Publication Data
US 2020/0280188 A1 Sep. 3, 2020

Related U.S. Application Data
(60) Provisional application No. 62/575,166, filed on Oct. 20, 2017.

(51) Int. Cl.
*H02J 3/32* (2006.01)
*H02J 3/38* (2006.01)
(Continued)

(52) U.S. Cl.
CPC .............. *H02J 7/1415* (2013.01); *H02J 3/32* (2013.01); *H02J 3/381* (2013.01); *H02J 3/40* (2013.01);
(Continued)

(58) Field of Classification Search
USPC ........................................................... 307/20
See application file for complete search history.

(56) References Cited

U.S. PATENT DOCUMENTS 5,563,802 A   10/1996  Plahn et al.
7,999,405 B2   8/2011  Peterson
(Continued)

FOREIGN PATENT DOCUMENTS

CN   202634066 U   12/2012
CN   102991364 A    2/2015

OTHER PUBLICATIONS

International Search Report and Written Opinion Received for PCT Application PCT/IB2018/058117, dated Jan. 16, 2019, 11 pages.

*Primary Examiner* — Rexford N Barnie
*Assistant Examiner* — Xuan Ly
(74) *Attorney, Agent, or Firm* — Foley & Lardner LLP

(57) ABSTRACT

A power generation system comprises a generator set, a switch device, an electrical storage device, a first inverter, a second inverter, and a controller. The switch device includes an input terminal connected to the generator set and an output terminal connected to a load. The first inverter is connected between the input terminal and the electrical storage device. The second inverter is connected between the output terminal and the electrical storage device. The controller is communicably coupled to the generator set, the switch device, the first inverter, and the second inverter. The controller is configured to determine whether an external power source is providing power to the load and, if not, the controller operates the power generation system in a first state. If the external power source is providing power to the load, the controller operates the power generation system in a second state.

20 Claims, 12 Drawing Sheets

(51) Int. Cl.
*H02J 7/14* (2006.01)
*H02J 9/06* (2006.01)
*H02J 3/40* (2006.01)
*H02J 3/46* (2006.01)

(52) U.S. Cl.
CPC ............ H02J 3/466 (2020.01); H02J 7/1438 (2013.01); H02J 9/062 (2013.01); *H02J 2300/24* (2020.01)

(56) References Cited

U.S. PATENT DOCUMENTS

| | | |
|---|---|---|
| 8,022,572 B2 | 9/2011 | Vyas et al. |
| 8,987,939 B2 | 3/2015 | Yu et al. |
| 2008/0157594 A1* | 7/2008 | Peterson .................. H02P 9/48 307/26 |
| 2009/0015021 A1 | 1/2009 | Towada |
| 2012/0056436 A1 | 3/2012 | Russell et al. |
| 2013/0214604 A1 | 8/2013 | Johnson, Jr. |
| 2015/0097437 A1 | 4/2015 | Votoupal et al. |
| 2019/0084444 A1* | 3/2019 | Ge .......................... B60L 50/15 |

* cited by examiner

HYBRID UNIVERSAL LOAD CONDITIONER

CROSS-REFERENCE TO RELATED PATENT APPLICATIONS

This application claims the benefit of and priority to U.S. Provisional Application No. 62/575,166, filed Oct. 20, 2017, which is incorporated herein by reference in its entirety.

TECHNICAL FIELD

The present disclosure generally relates to electrical generator sets.

BACKGROUND

A generator set ("genset") may operate in conjunction with renewable power sources such as solar energy sources, wind energy sources, and so on. With the complement of such external power sources, the required output power from the genset to meet a load demand may be below a rated value, and an engine of the genset may be inefficiently running at a fixed speed. A variable speed genset, which operates at a varying speed in accordance with the power demand of the load, may increase genset efficiency and reduce engine fuel consumption. When the load is light, the engine of the variable speed genset can operate at a lower speed. When the load is heavy, the speed of the engine can increase accordingly. Many fixed speed gensets and variable speed gensets are operated inefficiently.

SUMMARY

In one aspect, the inventive concepts disclosed herein are directed to a power generation system comprising a generator set, a switch device, an electrical storage device, a first inverter, a second inverter, and a controller. The generator set includes an engine. The switch device is configured to connect the generator set to a load, the switch device having an input terminal electrically connected to the generator set and an output terminal electrically connected to the load. The first inverter is connected between the input terminal of the switch device and the electrical storage device. The second inverter is connected between the output terminal of the switch device and the electrical storage device. The controller is communicably coupled to the generator set, the switch device, the first inverter, and the second inverter. The controller is configured to determine whether an external power source is providing power to the load. The controller is further configured to in response to determining that the external power source is not providing power to the load, operate the power generation system in a first state in which the engine of the generator set operates at a first speed, the switch device is closed to connect the generator set to the load, and the electrical storage device is charged by the generator set through at least one of the first inverter or the second inverter. The controller is further configured to in response to determining that the external power source is providing power to the load, operate the power generation system in a second state in which the engine operates at a second speed lower than the first speed, the switch device is opened, and the generator set provides power to the load through the first inverter and the second inverter, wherein the first inverter operates as a rectifier.

In some embodiments, the controller is further configured to detect that the external power source is being added to provide power to the load and in response to detecting the external power source is being added, switch the power generation system from the first state to the second state by: reducing a speed of the engine of the generator set from the first speed to the second speed, operating the first inverter as a rectifier, and opening the switch device.

In some embodiments, the controller is further configured to detect that the external power source is being removed, and in response to detecting the external power source is being removed, switch the power generation system from the second state to the first state by configuring the electrical storage device to provide power to the load, increasing a speed of the engine of the generator set from the second speed to the first speed, and closing the switch device.

In some embodiments, the power generation system further comprises a sensing device communicably coupled to the controller, the sensing device configured to measure a voltage level at the output terminal of the switch device, the measured voltage level providing an indication of the external power source providing power to the load. In some embodiments, the second state further comprises charging the electrical storage device by the generator set power generation system further comprises.

In some embodiments, in response to determining that the external power source is not meeting the load demand, the controller is configured to switch from the second state to the first state by providing a control input to the generator set to increase engine speed to the first speed, providing power to the load from the generator set through the first inverter and the second inverter, wherein the first inverter is configured to operate as a rectifier and the second inverter is configured to synchronize the power with the load. In response to determining that the engine of the generator set is operating at the first speed, the controller is configured to connect the generator set to the load through the switch device, and operate the power generation system in the first state.

In some embodiments, in response to determining that the external power source is meeting the load demand, the controller is configured to switch from the first state to the second state by disconnecting the generator set to the load with the switch device, providing a control input to the generator set to decrease engine speed to the second speed, and operating the power generation system in the second state.

In some embodiments, the controller is further configured to operate the power generation system in an alternate mode when the engine of the generator set is off, the alternate mode comprising determining, based on a measured voltage level received from the sensing device, an increased load demand or a decreased load demand, and in response to determining a decreased load demand, providing power from the external power source to the electrical storage device through the second inverter.

In some embodiments of the alternate mode, in response to determining an increased load demand, the generator set is configured to provide power to the load from the electrical storage device through the second inverter, provide power to the alternator from the electrical storage device through the first inverter, provide a control input to the generator set to start the engine, and in response to determining that the engine of the generator set is operating at the first speed, connect the generator set to the load through the switch device.

In a further aspect, the inventive concepts disclosed herein are directed to a controller for a power generation system. The controller is communicably coupled to a generator set, a switch device, a first inverter, and a second inverter. The controller is configured to determine whether an external power source is providing power to the load. The controller is further configured to in response to determining that the external power source is not providing power to the load, operate the power generation system in a first state in which the engine of the generator set operates at a first speed, the switch device is closed to connect the generator set to the load, and the electrical storage device is charged by the generator set through at least one of the first inverter or the second inverter. The controller is further configured to in response to determining that the external power source is providing power to the load, operate the power generation system in a second state in which the engine operates at a second speed lower than the first speed, the switch device is opened, and the generator set provides power to the load through the first inverter and the second inverter, wherein the first inverter operates as a rectifier.

In some embodiments, the controller is further configured to detect that the external power source is being added to provide power to the load and in response to detecting the external power source is being added, switch the power generation system from the first state to the second state by: reducing a speed of the engine of the generator set from the first speed to the second speed, operating the first inverter as a rectifier, and opening the switch device.

In some embodiments, the controller is further configured to detect that the external power source is being removed, and in response to detecting the external power source is being removed, switch the power generation system from the second state to the first state by configuring the electrical storage device to provide power to the load, increasing a speed of the engine of the generator set from the second speed to the first speed, and closing the switch device. In some embodiments, the second state further comprises charging the electrical storage device by the generator set power generation system further comprises.

In some embodiments, in response to determining that the external power source is not meeting the load demand, the controller is configured to switch from the second state to the first state by providing a control input to the generator set to increase engine speed to the first speed, providing power to the load from the generator set through the first inverter and the second inverter, wherein the first inverter is configured to operate as a rectifier and the second inverter is configured to synchronize the power with the load. In response to determining that the engine of the generator set is operating at the first speed, the controller is configured to connect the generator set to the load through the switch device, and operate the power generation system in the first state.

In some embodiments, in response to determining that the external power source is meeting the load demand, the controller is configured to switch from the first state to the second state by disconnecting the generator set to the load with the switch device, providing a control input to the generator set to decrease engine speed to the second speed, and operating the power generation system in the second state.

In some embodiments, the controller is further configured to operate the power generation system in an alternate mode when the engine of the generator set is off, the alternate mode comprising determining, based on a measured voltage level received from the sensing device, an increased load demand or a decreased load demand, and in response to determining a decreased load demand, providing power from the external power source to the electrical storage device through the second inverter.

In some embodiments of the alternate mode, in response to determining an increased load demand, the generator set is configured to provide power to the load from the electrical storage device through the second inverter, provide power to the alternator from the electrical storage device through the first inverter, provide a control input to the generator set to start the engine, and in response to determining that the engine of the generator set is operating at the first speed, connect the generator set to the load through the switch device.

In a further aspect, the inventive concepts disclosed herein are directed to a method of operating a power generation system, the power generation system comprising a controller, a generator set, a switch device, a first inverter, a second inverter, and an electrical storage device. The method includes determining whether an external power source is providing power to the load. The method further includes in response to determining that the external power source is not providing power to the load, operate the power generation system in a first state in which the engine of the generator set operates at a first speed, the switch device is closed to connect the generator set to the load, and the electrical storage device is charged by the generator set through at least one of the first inverter or the second inverter. The method further includes in response to determining that the external power source is providing power to the load, operating the power generation system in a second state in which the engine operates at a second speed lower than the first speed, the switch device is opened, and the generator set provides power to the load through the first inverter and the second inverter, wherein the first inverter operates as a rectifier.

In some embodiments, the method further includes detecting that the external power source is being added to provide power to the load, and in response to detecting the external power source is being added, switching the power generation system from the first state to the second state by reducing a speed of the engine of the generator set from the first speed to the second speed, operating the first inverter as a rectifier, and opening the switch device.

In some embodiments, the method further includes detecting that the external power source is being removed, and in response to detecting the external power source is being removed, switching the power generation system from the second state to the first state by configuring the electrical storage device to provide power to the load, increasing a speed of the engine of the generator set from the second speed to the first speed, and closing the switch device.

These and other features, together with the organization and manner of operation thereof, will become apparent from the following detailed description when taken in conjunction with the accompanying drawings.

DETAILED DESCRIPTION

Figure 1:
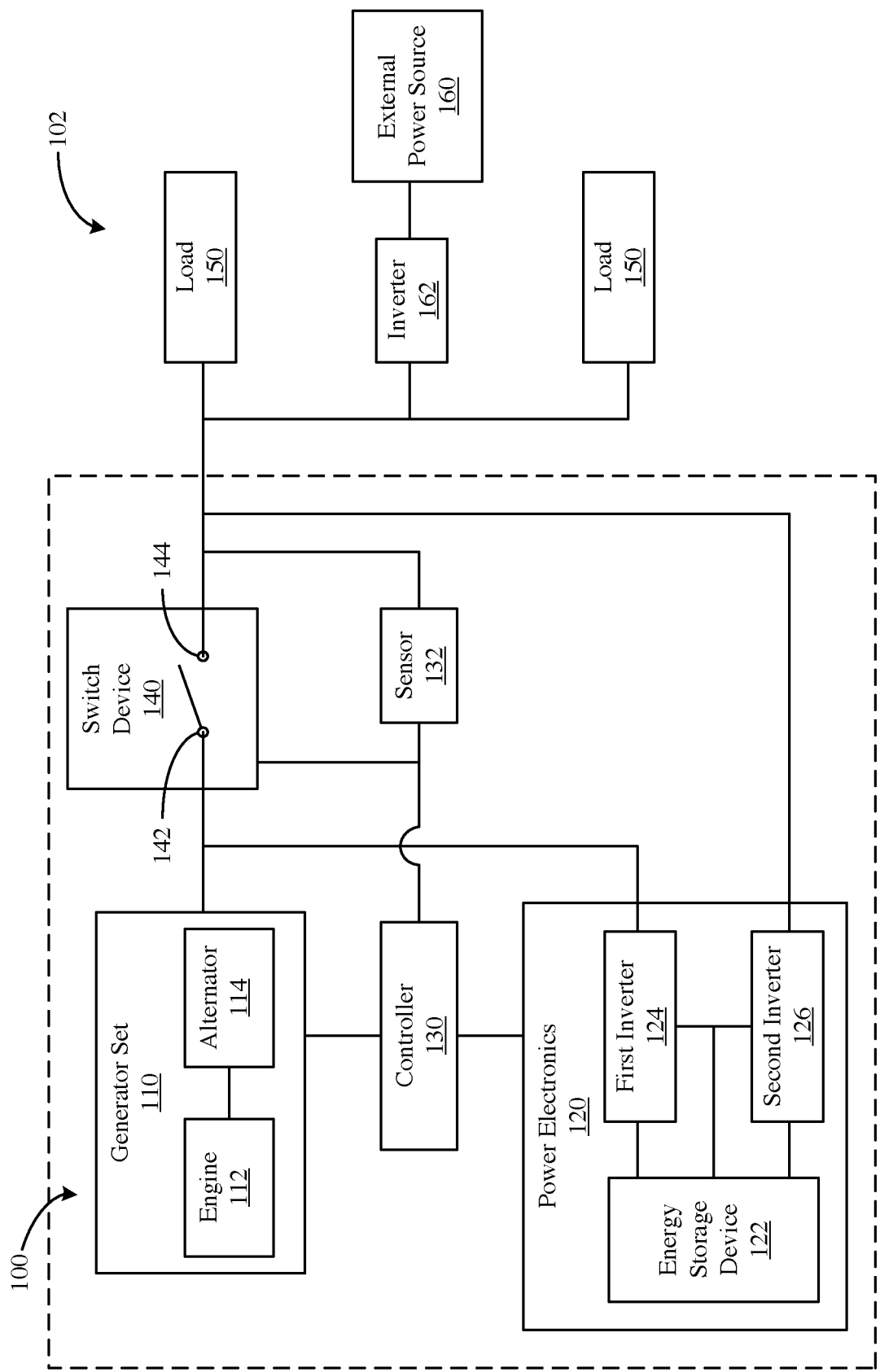
FIG. 1 is a block diagram of a power generation system, according to an example embodiment.

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alternations and further modifications in the illustrated embodiments, and any further applications of the principles of the disclosure as illustrated therein as would normally occur to one skilled in the art to which the disclosure relates are contemplated herein.

Referring to the Figures generally, various embodiments disclosed herein relate to systems and methods for controlling a power generation system operating in conjunction with an external power source to provide power to a load. The external power source may include, for example, renewable power sources such as solar energy source, wind energy source, and so on. External power sources, such as the aforementioned renewable sources, may not be always available. The power generation system includes a generator set ("genset") and power electronics connected to each other. The genset may be a fixed speed genset. The power electronics include an energy storage device (e.g., battery, supercapacitor) and two inverters. When the external power source is not supplying power, the genset may be controlled to work in normal operation to supply power to the load. The two bi-directional inverters may operate to charge excess energy not required by the load in the energy storage device and, in some embodiments, may additionally act as active filters for the power generation system. When a transient load is applied, the two inverters and the energy storage device may help maintain a fixed output voltage and frequency. When the external power is added to supply most power demand of the load, the genset may be controlled to operate in a fixed reduced speed, a variable reduced speed, an idle state, or is turned off in order to save fuel and extend engine life. One of the inverters acts as a rectifier to convert the alternating current (AC) power from the genset into direct current (DC) power, and the other inverter converts the DC power from the first inverter or from the energy storage device into AC power that satisfies the voltage and frequency requirements of the load. Excess AC power generated by the genset and converted by the first inverter to DC power can be used to charge the energy storage device. When the external power suddenly disappears, the energy storage device can provide DC power which is converted into AC power of appropriate voltage and frequency by one of the inverters. The genset can be controlled (e.g., temporarily) to speed up and supply power to the load either by directly providing synchronous AC power through the closed switch or indirectly through the first and second inverters while the switch remains in an open state.

Referring now to FIG. 1, a block diagram of a power generation system 100 connected to a power grid 102 is shown according to an example embodiment. The power system 100 is shown to comprise a genset 110, power electronics 120, a controller 130, a sensor 132, and a switch device 140. The power generation system 100 may be implemented on vehicles (e.g., RVs), stationary facilities, industrial work machines, etc. The power grid 102 is shown to include multiple loads 150 and an external power source 160. The loads 150 may include various types of electric equipment, such as one or more air conditioners, lighting, kitchen appliance, entertainment deices, and/or other different devices. Power demand of the load 150 may vary over time. For example, power demand of the load 150 may be light when most electric devices are turned off, or may be high when most electric devices are turned on. The external power source 160 is connected to the power grid 102 to provide power to the load 150 via an inverter 162. The external power source 160 may include renewable energy sources, such as photovoltaic power, wind power, etc. The external power source 160 may not be always available to supply power to the load 150.

In the illustrated embodiment, the genset 110 includes an engine 112 as a prime mover and an alternator 114 as an electric machine coupled to and driven by the engine 112. The engine 112 may include an internal combustion engine or any other suitable prime mover that consumes fuel (e.g., gasoline, diesel fuel, natural gas, etc.) during operation and provides a mechanical energy (e.g., a rotational torque) to drive the alternator 114 through, for example, a crankshaft. The alternator 114 is operatively coupled to the engine 112 and may be powered by the engine 112 to generate electric power for running, for example, the load 150. The alternator 114 may include, but is not limited to, a synchronous generator, a permanent magnet machine, an induction machine, a switched reluctance machine, or any other suitable electric motor or generator capable of generating electrical output in response to mechanical input, or mechanical output in response to electrical input. In some embodiments, the alternator 114 may be a starter/alternator, integrating the functions of a starter motor and an alternator used in the engine system. The genset 110 may operate at a fixed speed to produce electricity at a grid frequency. In some embodiments, the rated rotational speed of the engine 112 and the alternator 114 is 1500 rpm for 50 Hz grid applications, or 1800 (or 1200) rpm for 60 Hz applications.

The power electronics 120 include an energy storage device 122, a first inverter 124, and a second inverter 126. The energy storage device 122 may include a battery (e.g., Lithium-ion batteries, Nickle-Metal Hydride batteries, Lead-acid batteries), a supercapacitor, a flywheel, or any suitable energy storage device that can store electrical energy and release the stored energy for usage. In some embodiments, the energy storage device 122 may include multiple devices, such as a battery bank including multiple batteries. The energy storage device 122 may be configured to provide power to supplement the power generated by the genset 110 (e.g., in periods of high demand) and store excess power generated by the genset 110 (e.g., in periods of low demand). The first inverter 124 and the second inverter 126 can each be configured to operate as an inverter that converts a DC power to an AC power or a rectifier that converts an AC power to a DC power. In some embodiments, the first inverter 124 and/or the second inverter 126 may include an H-bridge configuration with four transistors (e.g., insulated gate bipolar transistors (IGBTs), field effect transistors (FETs), gated thyristors, silicon controller rectifiers (SCR)) controlled by pulse width modulated (PWM) signals. The PWM control signals may selectively and individually drive each gate/switch of the inverters. It is noted that in some embodiments the first inverter 124 may be replaced by a rectifier and the second inverter 126 by a single direction/output only inverter.

The switch device 140 connects the power generation system 100 to the power grid 102. In some embodiments, the switch device 140 may include an electrically controlled output contactor which includes a first terminal 142 (also called an input terminal) and a second terminal 144 (also called an output terminal). The switch device 140 may be put at an open state in which the input terminal 142 is disconnected from the output terminal 144, or a closed state in which the input terminal 142 is connected to the output terminal 144. The genset 110 is connected to the input terminal 142. The power grid 102 is connected to the output terminal 144. The first inverter 124 is connected between the input terminal 142 and the energy storage device 122. The second inverter 126 is connected between the output terminal 144 and the energy storage device 122.

A sensor 132 is connected to the output terminal 144 of the switch device 140 and configured to monitor the status of the power grid 102. In some embodiments, the sensor 132 includes a voltage sensor configured to sense the voltage at the power grid 102, which may reflect the presence or absence of the external power source 160, and any change of power demand of the load 150. For example, when there is a step load or sudden reduction of the power provided by the external power source 160, the sensor 132 can sense a voltage dip at the power grid 102. When there is load reduction or sudden increase of the power provided by the external power source 160, the sensor 132 can sense a voltage surge at the power grid 102. In some embodiments, the sensor 132 may include other types of sensors, such as current sensor or other type of load sensor.

The controller 130 is communicably coupled to the genset 110, the power electronics 120, the switch device 140, and the sensor 132 and configured to control the operation of the genset 110, the power electronics 120, and the switch device 140 based on information received from the sensor 132. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections.

The controller 130 may be implemented as a general-purpose processor, an application specific integrated circuit (ASIC), one or more field programmable gate arrays (FPGAs), a digital signal processor (DSP), a group of processing components, or other suitable electronic processing components. In some embodiments, the controller 130 may include one or more memory device (e.g., NVRAM, RAM, ROM, Flash Memory, hard disc storage, etc.) that stores data and/or computer code for facilitating the various processes executed by the controller 130. The one or more memory devices may be or include tangible, non-transient volatile memory or non-volatile memory, database components, object code components, script components, or any other type of information structure for supporting the various activities and information structures described herein. In some embodiments, the controller 130 may be integrated as part of an engine controller. In other embodiments, the controller 130 may be a standalone device.

The controller 130 can control the speed of the engine 112 of the genset 110, the state of the switch device 140 (i.e., open state or closed state), and the operation state of the first inverter 124 and the second inverter 126 (i.e., operate as inverter or rectifier). The control process is discussed in more detail below with reference to FIGS. 2-8. Components shown in FIGS. 2-8 substantially correspond to the same components shown in FIG. 1, except that the controller 130 and the sensor 132 are omitted from FIGS. 2-8 in order to show the process more clearly.

Figure 2:
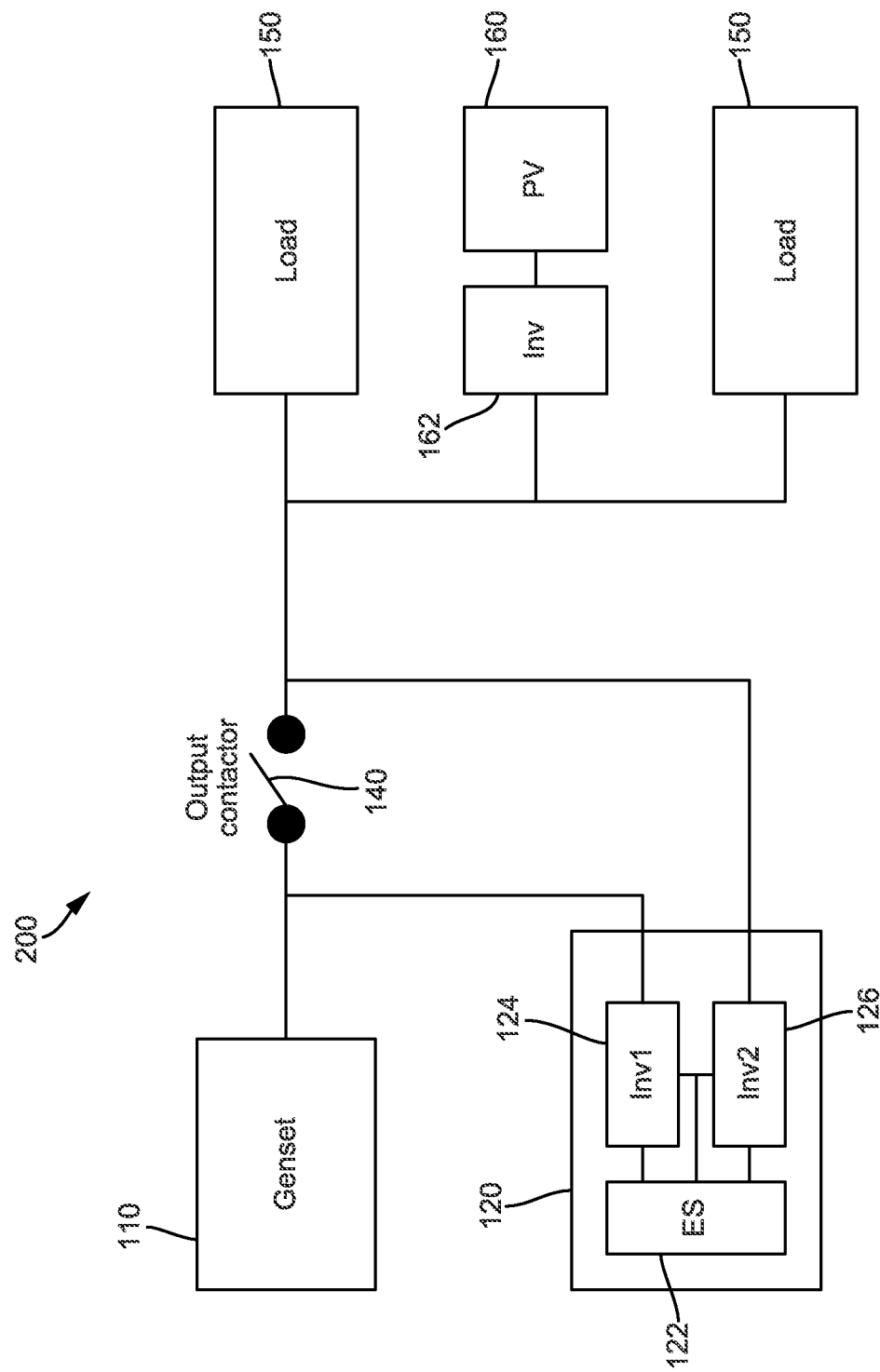
FIG. 2 is a configuration of the power generation system of FIG. 1 in which the generator set is off, according to an example embodiment.

Referring to FIG. 2, a configuration 200 of the power generation system 100 is shown in which the genset 110 is off. In the configuration 200, the genset 110 is off, i.e., the speed of the engine 112 is zero. Because no power is output from the genset 110, the switch device 140 (e.g., output contactor) is placed in the open state.

Figure 3:
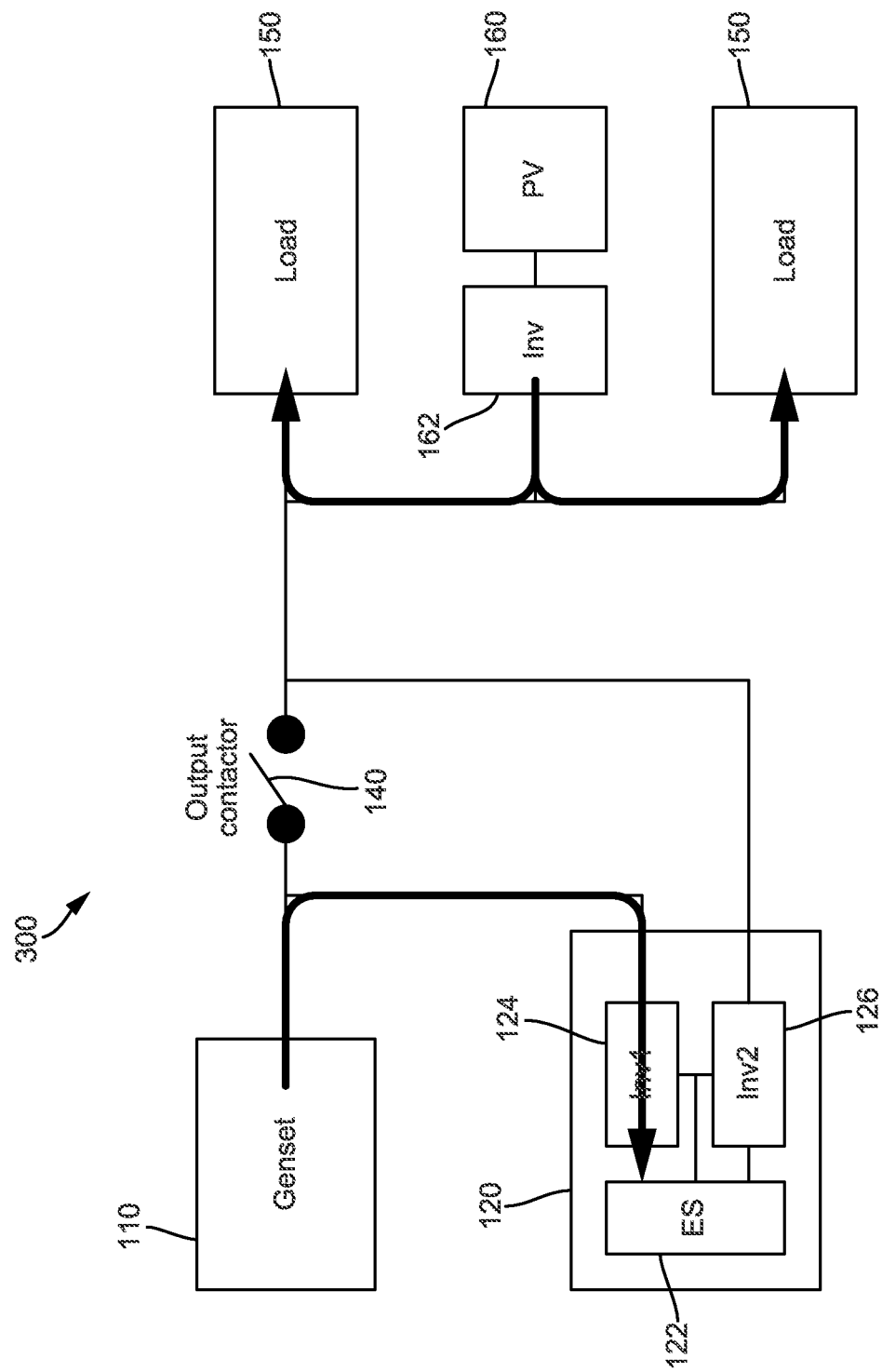
FIG. 3 is another configuration of the power generation system of FIG. 1 in which the genset is starting up, according to an example embodiment.

Referring to FIG. 3, a configuration 300 of the power generation system 100 is shown in which the genset 110 is starting up. In the configuration 300, the speed of the engine 112 is increasing but has not reached the rated speed (e.g., 1500 rpm for 50 Hz grid applications, or 1800 (or 1200) rpm for 60 Hz applications, in some implementations). Thus, the voltage and/or frequency of the AC power output from the genset 110 have not synchronized with the power grid 102. The controller 130 places the switch device 140 in the open state so that the genset 110 is not connected to the power grid 102. The controller 130 operates the first inverter 124 as a charger (i.e., rectifier), which converts the AC power output from the genset 110 to DC power and charges the energy storage device 122 with the DC power. In some embodiments, the controller 130 can monitor a state of charge of the energy storage device 122. In response to determining a low charge condition (e.g., a charge below a threshold charge level), the controller 130 can control the first inverter 124 to receive power from the genset 110. Power can also be sent to the power grid 102 via the second inverter 126 from the DC power provided by the energy storage device 122 or the first inverter 124.

Figure 4:
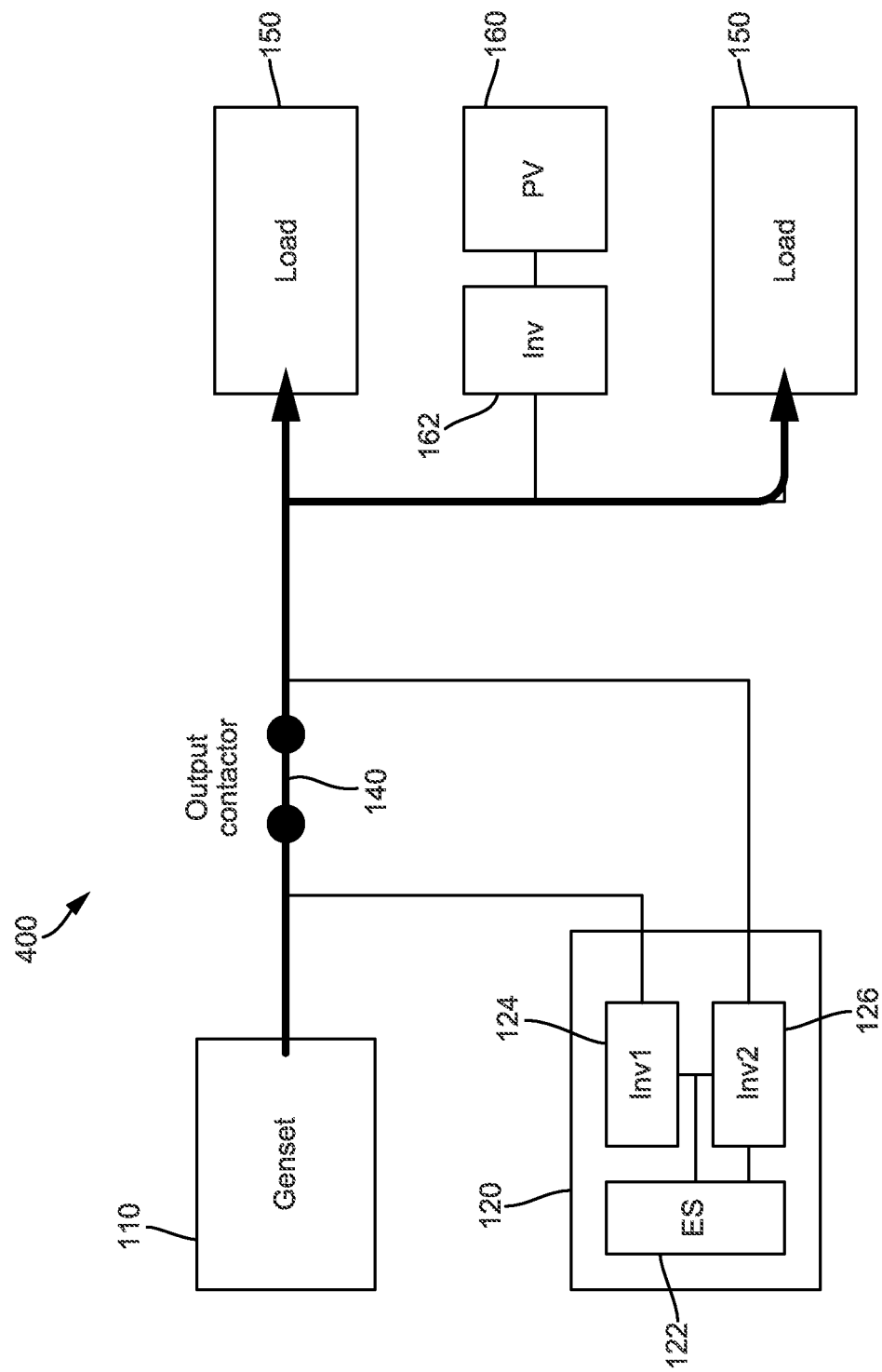
FIG. 4 is another configuration of the power generation system of FIG. 1 in which the genset is in normal operation and no external power source is present, according to an example embodiment.

Referring to FIG. 4, a configuration 400 of the power generation system 100 is shown in which the genset 110 is in normal operation and the external power source 160 is absent or, alternatively, where the genset 110 is paralleled to the power grid 102 and another source external power is provided on it. In the configuration 400, the engine 112 is running at the rated speed (e.g., 1500 rpm for 50 Hz grid applications, or 1800 (or 1200) rpm for 60 Hz applications, in some implementations). The controller 130 controls the voltage, frequency, and/or phase of the AC power output from the genset 110 to synchronize with those of the power grid 102, and closes the contacts of the switch device 140 so that the genset 110 is providing power to the power grid 102.

The controller 130 can determine that a transient state occurs during the operation based on, for example, information received from the sensor 132. As discussed above, when a large load is added, the sensor 132 may sense a voltage dip; when a large load is removed, the sensor 132 may sense a voltage surge. Any suitable method may be used to detect or determine whether a large load has been added or removed. In some embodiments, the controller 130 can be configured to use various threshold values and/or percentages, which may be based on the power output of the genset 110 in normal operation, the steady-state power supply provided by the external power source 160, relative load size, capacity of the energy storage device 122, etc. For example, the energy storage device 122 may have a rated capacity sized to allow for particular time transient (e.g., 10 second, 30 second, 1 minute transient), and in this example, a threshold value can be based on the rated capacity size value.

In response to detecting the transient state, the controller 130 can control the first inverter 124 and/or the second inverter 126 to recharge or discharge the energy storage device 122 to help absorb the transient. For example, when a large load is added, the controller 130 can operate the first inverter 124 and/or the second inverter 126 to convert the DC power drawn from the energy storage device 122 to AC power and supply the AC power to the load 150 to supplement the AC power output from the genset 110. When a large load is removed, the controller 130 can operate the first inverter 124 and/or the second inverter 126 to convert the excess AC power produced by the genset 110 to DC power and charge the energy storage device 122 with the DC power. In some embodiments, the first inverter 124 and the second inverter 126 may also act as active filters for reactive power injection or cancellation and apply total harmonic distortion (THD) correction to the output voltage by the power generation system 100.

Figure 5:
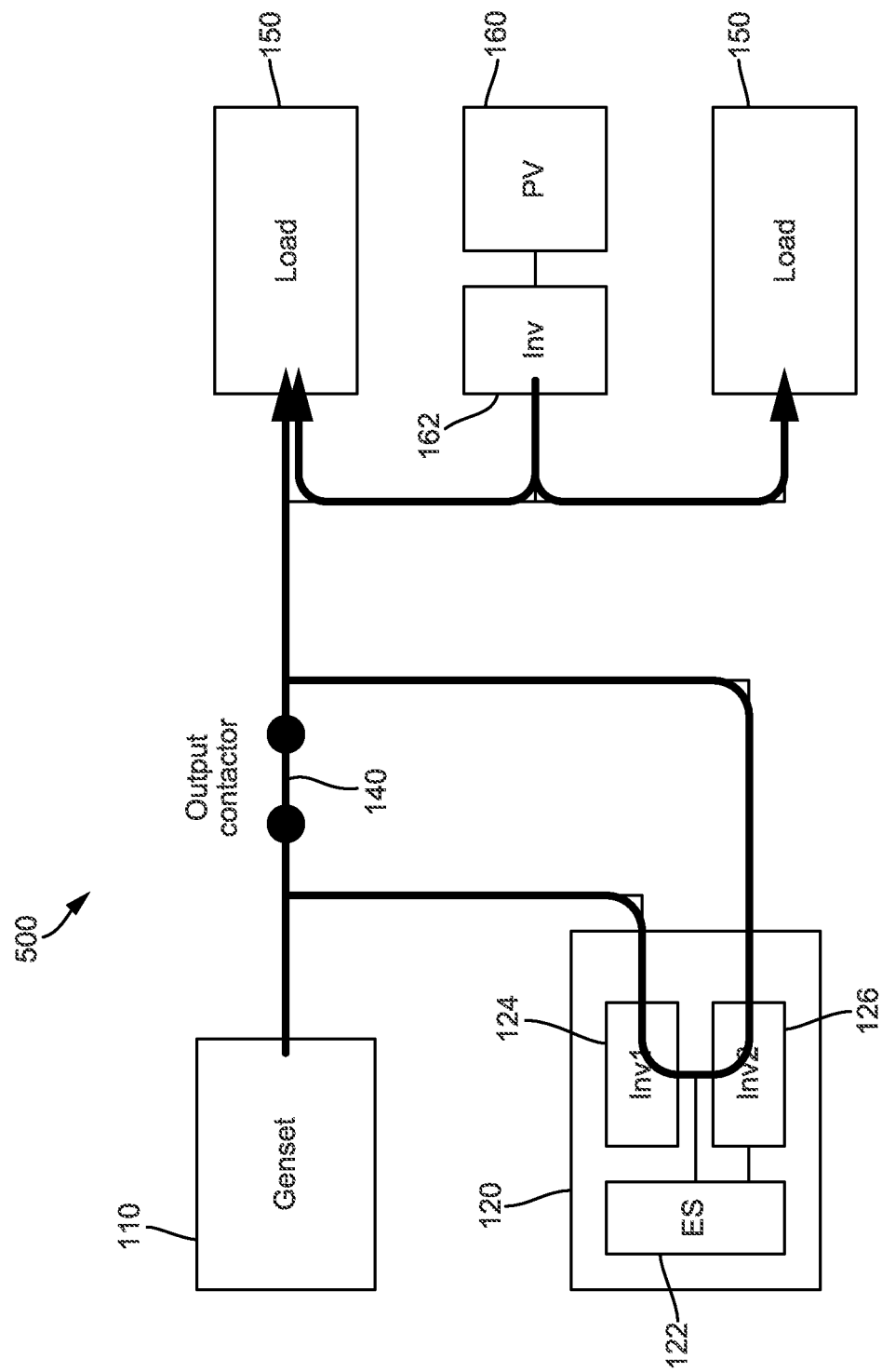
FIG. 5 is another configuration of the power generation system of FIG. 1 in which the external power source is present, according to an example embodiment.

Referring to FIG. 5, a configuration 500 of the power generation system 100 is shown in which the external power source 160 is added to the power grid 102 when the genset 110 is in normal operation. In some embodiments, when the external power source 160 starts to provide power to the power grid 102, the sensor 132 can sense the presence of the external power source 160 by detecting the voltage at the power grid 102. In the configuration 500, the genset 110 can supply power to the load 150 either directly via synchronously paralleled power generation coupled through the switch 140, or indirectly through the first inverter 124 and the second inverter 126. In particular, in response to detecting the presence of the external power source 160, the controller 130 operates the first inverter 124 as a rectifier that converts the AC power output from the genset 110 to DC power to charge the energy storage 122 and provide DC power to the second inverter 126. It can also operate the second inverter 126 to convert the DC power into AC power. The AC power output from the second inverter 126 is synchronized with the AC voltage at the power grid 102 in terms of amplitude, frequency, and/or phase.

In the configuration 500, the genset 110 or external power source 160 can charge the energy storage device 112 via either the first inverter 124 or the second inverter 126. Surge power can also be provided to a suddenly increased load 150 (a load "step") from the energy storage device 112 via either the first inverter 124 or the second inverter 126 and reduce or remove the need for excess "spinning reserve" capability in the genset 110 and allow time for the genset 110 to react to the change. Excess energy from a sudden load demand drop can also be absorbed by the energy storage device 112 via either the first inverter 124 or the second inverter 126 and allow time for the genset 110 to react to the change. If a large load, such as an electric engine start, is known to be forthcoming, the genset 110 can be "preloaded" for the load and the excess energy temporarily absorbed by the energy storage device 112 via either the first inverter 124 or the second inverter 126. Loads that exceed the rated output or damage curve of the genset 110 can also be temporarily accommodated by providing energy from the energy storage device 112 via either the first inverter 124 or the second inverter 126. In addition, the response of the genset 110 to load changes when coupled either synchronously (directly via the switch 140) or asynchronously (indirectly via inverters 124, 126) can be allowed to happen slowly to allow the engine of the genset 110 to gradually respond to the load changes, thereby allowing the genset 110 to save fuel, avoid excess emissions, and reduce noise and/or human perception of the load change. In some embodiments, the first inverter 124 and the second inverter 126 may also act as active filters for reactive power injection or cancellation and apply total harmonic distortion (THD) correction to the output voltage by the power generation system 100.

Figure 6:
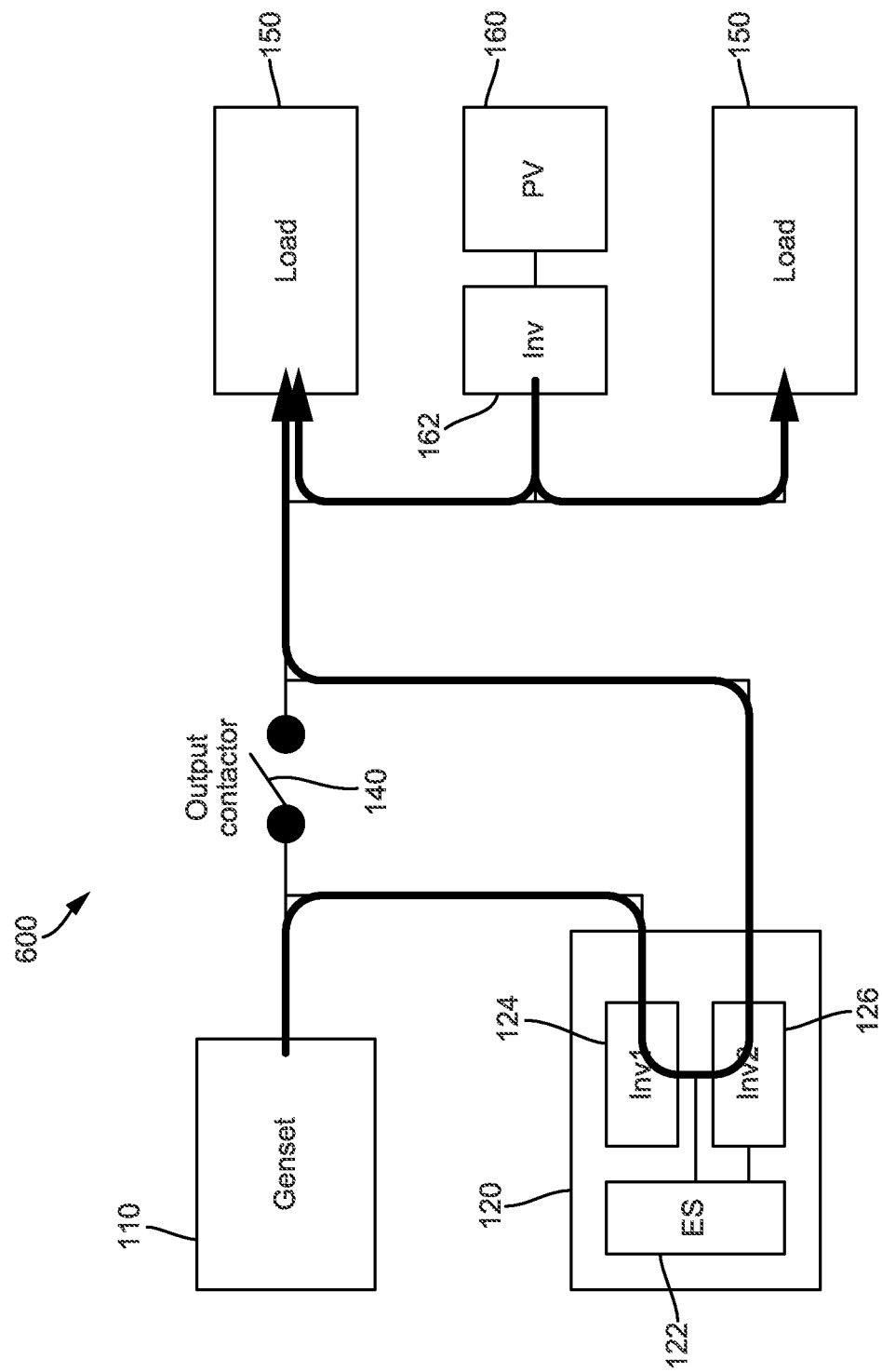
FIG. 6 is another configuration of the power generation system of FIG. 1 in which the external power source is present and the genset is in the idle state, according to an example embodiment.

Referring to FIG. 6, a configuration 600 of the power generation system 100 is shown in which the external power source 160 covers most (e.g., >80%) of the power demand of the load 150 and the genset 110 operates at an idle state, or, alternatively, the external power source 160 covers enough of the load 150 power demand that the engine 112 of the genset is operating inefficiently. In response to determining that the external power source 160 covers most of the power demand of the load 150, the controller 130 can instruct to turn off the engine 112, or decrease the speed of the engine 112 to a low fixed, a variable speed, or an idle speed. These speeds can be significantly lower than the rated speed of the engine 112. For example, the idle speed may be as low as 500 rpm while the rated speed is 1200, 1500, or 1800 rpm. The direct AC output from the genset 110 does not match the grid applications in voltage and/or frequency. The controller 130 puts the switch device 140 at the open state and controls the genset 110 to supply power to the load 150 through the first inverter 124 and the second inverter 126. In particular, the controller 130 operates the first inverter 124 as a rectifier that converts the AC power output from the genset 110 to DC power and operates the second inverter 126 to convert the DC power into AC power. The AC power output from the second inverter 126 is synchronized with the AC voltage at the power grid 102 in terms of amplitude, frequency, and/or phase. In other words, in the configuration 600, the first inverter 124 supplies DC power, and the second inverter 126 provides fixed frequency (e.g., 50 Hz or 60 Hz) AC output voltage with desired THD. When the genset 110 operates at a low fixed, a variable speed, or an idle speed, fuel can be saved and engine lifetime can be extended.

In some embodiments, when the genset 110 operates at a low fixed, a variable speed, or an idle speed, the direct AC output may be sufficient to meet the demand of the load 150 and charge the energy storage device 122. The controller 130 can place the switch device 140 in the open state so that the genset 110 is not connected to the power grid 102. The controller 130 operates the first inverter 124 to convert the AC power output from the genset 110 to DC power and charges the energy storage device 122 with the excess DC power. The second inverter 126 converts the remaining DC power output from the energy storage device 122 and/or first inverter 124 to AC power to supply AC power to the load 150. The AC power output from the second inverter 126 is synchronized with the AC voltage at the power grid 102.

Figure 7:
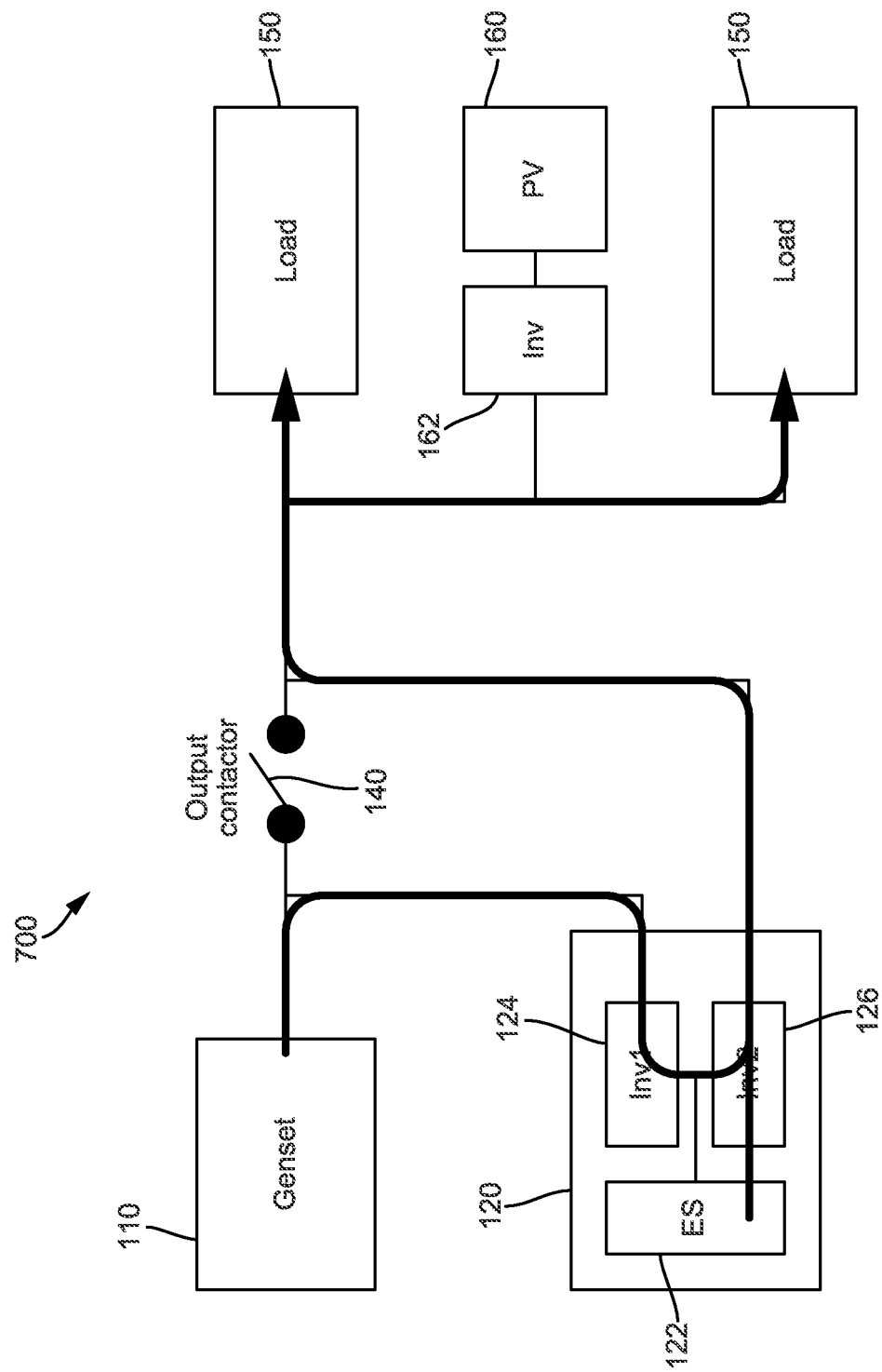
FIG. 7 is another configuration of the power generation system of FIG. 1 in which the external power source disappears, according to an example embodiment.

Referring to FIG. 7, a configuration 700 of the power generation system 100 is shown in which the power provided by the external power source 160 reduces or disappears from the power grid 102 when the genset 110 is operating at a low fixed, a variable speed, an idle speed, or an off state. In some embodiments, when the external power source 160 suddenly disappears, the sensor 132 can sense the reduction or disappearance of the power provided by the external power source 160 by detecting the voltage (e.g., a voltage dip) at the power grid 102. The power produced by the genset 110 operating at the reduced speed may not satisfy the power demand of the load 150. The controller 130 operates the second inverter 126 to draw power from the energy storage device 122 to supply the load 150. In particular, the second inverter 126 converts the DC power output from the energy storage device 122 to AC power and supplies the AC power to the load 150. The AC power output from the second inverter 126 is synchronized with the AC voltage at the power grid 102 in terms of amplitude, frequency, and/or phase.

At the same time, the controller 130 instructs the engine 112 to start or to increase in speed from the reduced or idle speed. Before reaching the rated speed (e.g., 1500 rpm for 50 Hz grid applications, or 1800 (or 1200) rpm for 60 Hz applications, in some implementations), the direct AC output from the genset 110 does not match the grid requirements. The controller 130 keeps the contacts of the switch device 140 in the open state and controls the genset 110 to supply power to the load 150 through the first inverter 124 and the second inverter 126 during the speeding up process. In particular, the controller 130 operates the first inverter 124 as a rectifier that converts the AC power output from the genset 110 to DC power and operates the second inverter 126 to convert the DC power into AC power. The AC power output from the second inverter 126 (i.e., the combined AC power output from the energy storage device 122 and the genset 110) is synchronized with the AC voltage at the power grid 102 in terms of amplitude, frequency, and/or phase.

Figure 7A:
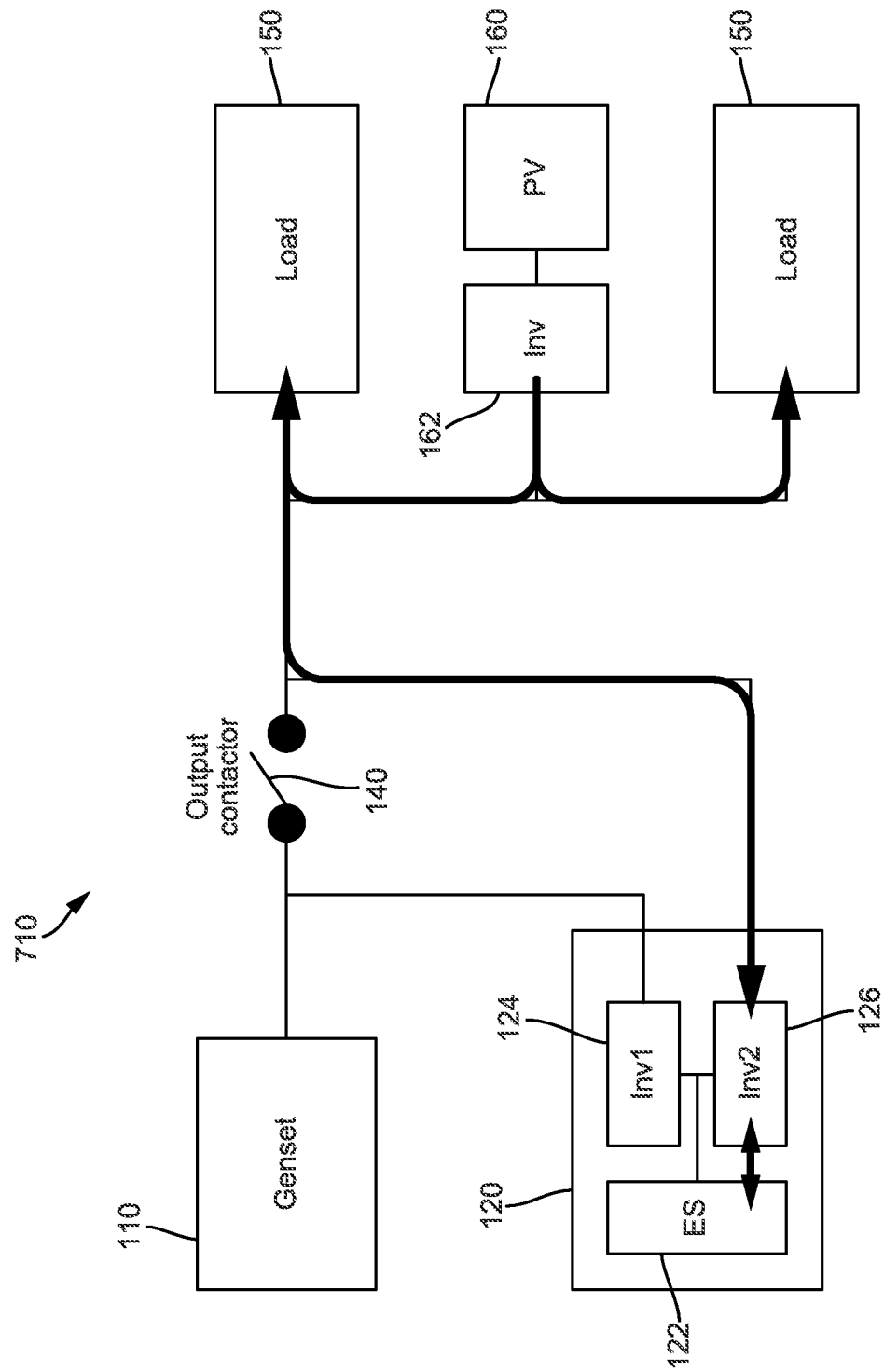
FIG. 7A is a configuration of the power generation system of FIG. 1 in which the genset is in an alternate operation mode, according to an example embodiment.
Figure 7B:
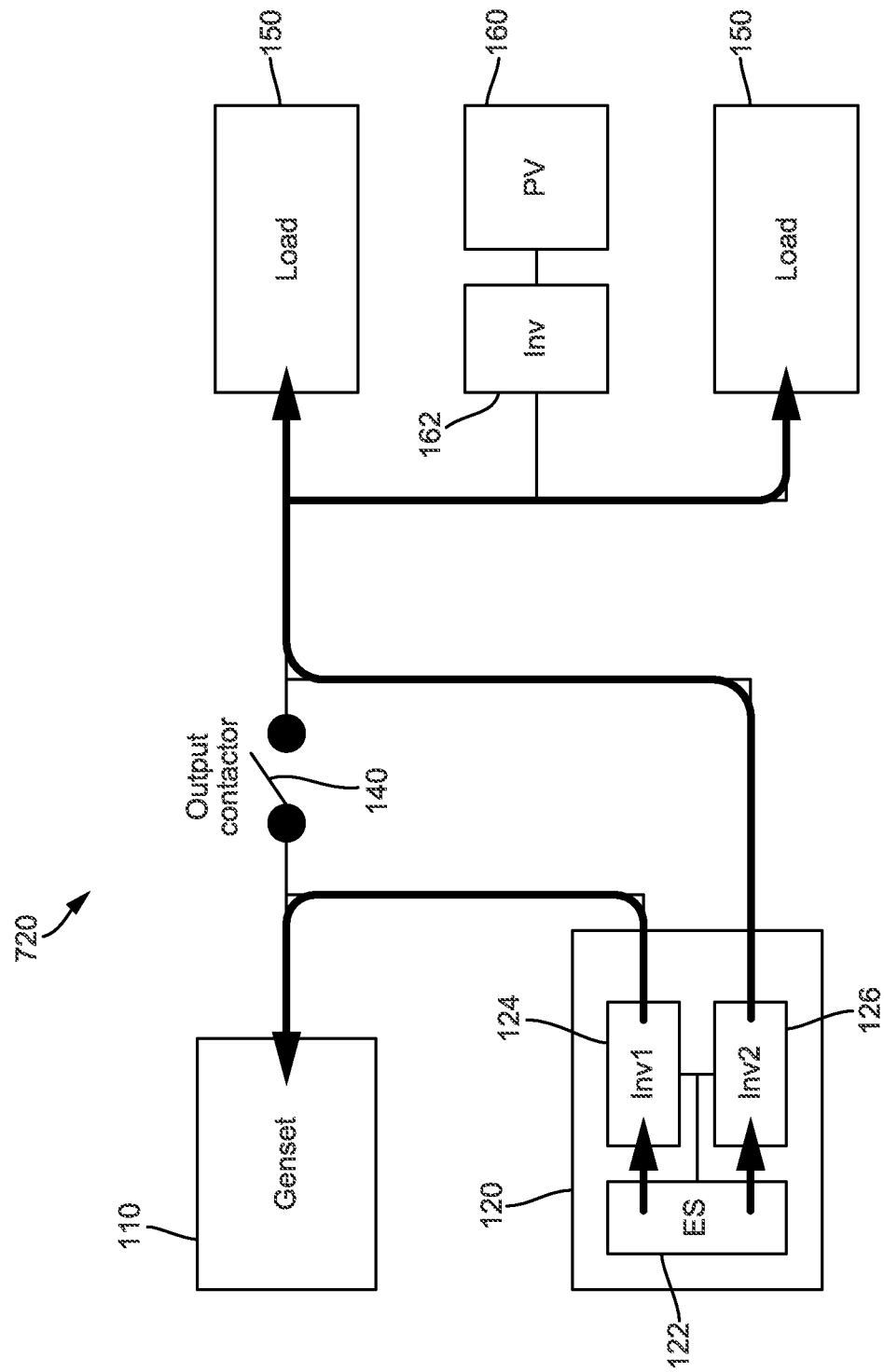
FIG. 7B is another configuration of the power generation system of FIG. 1 in which the genset is in the alternate operation mode, according to an example embodiment.
Figure 7C:
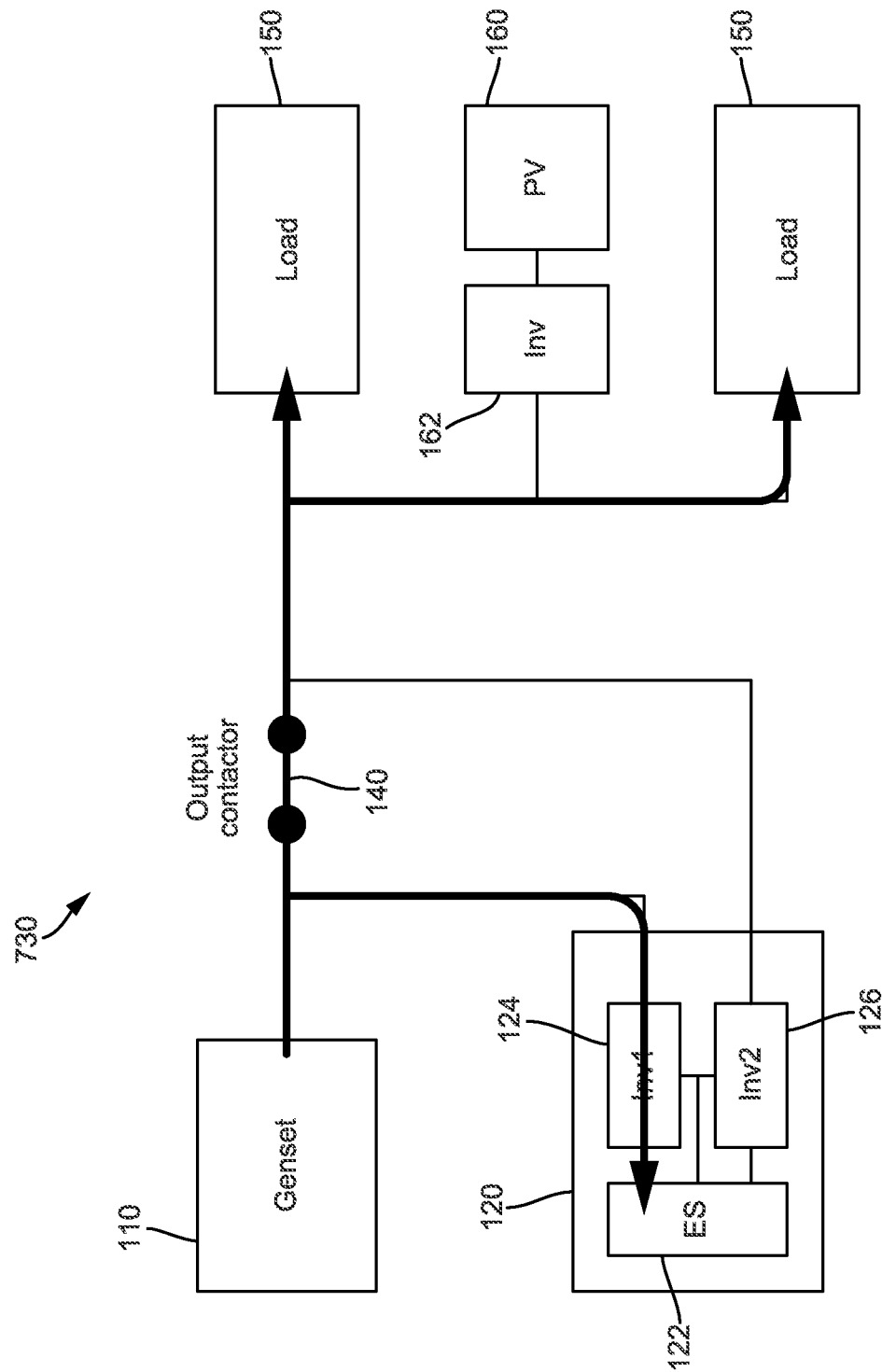
FIG. 7C is another configuration of the power generation system of FIG. 1 in which the genset is in the alternate operation mode, according to an example embodiment.

In some embodiments, the controller 130 can be configured to operate in an alternate operational mode to facilitate quickly starting and synchronizing the genset 110, as shown in FIGS. 7A-7C. The alternate operational mode may be used when the genset 110 is not operating (e.g., the engine 112 is off). In some embodiments of the alternate operational mode, the controller 130 opens the contacts of the switch device 140. In some embodiments of the alternate operational mode, the polarity of the first inverter 124 and/or the second inverter 126 may be switched or otherwise configured to provide DC power and/or AC power to and from the external power source 160. For example, each of the first inverter 124 and/or the second inverter 126 may include two or more inverters (e.g. subcircuits) to enable bidirectional flow of DC power and/or AC power.

Referring to FIG. 7A, configuration 710 shows one example configuration of the alternate mode. In configuration 710, the external power source 160 may provide power to the load 150 and/or to the energy storage device 122. For example, the external power source 160 may prioritize providing AC power to the load 150 during a transient stage of high demand. In contrast, during periods of low demand, the external power source 160 may prioritize power to the energy storage device 122 due to excess AC power produced by the external power source 160.

Referring to FIG. 7B, configuration 720 shows another example configuration of the alternate mode. In configuration 720, the energy storage device 122 may be used to decrease the time to restart and synchronize the genset 110, allowing the controller 130 to quickly close the contacts of the switch device 140. In configuration 720, power to the load 150 is supplied from the external energy device 122, but some of the power from the energy storage device 122 is directed through the first inverter 124 into the alternator 114 to operate the alternator as an electric motor to assist genset 110 start-up and grid resynchronization.

Referring to FIG. 7C, configuration 730 shows the engine 112 running at the rated speed, and the voltage, frequency, and/or phase of the AC power output from the genset 110 is synchronized with those of the power grid 102. In configuration 730, the controller 130 closes the contacts of the switch device 140 so that the genset 110 is providing power to the load 150. In some embodiments of configuration 730, the genset 110 may supply power to the energy storage device 122 as described above.

Figure 8:
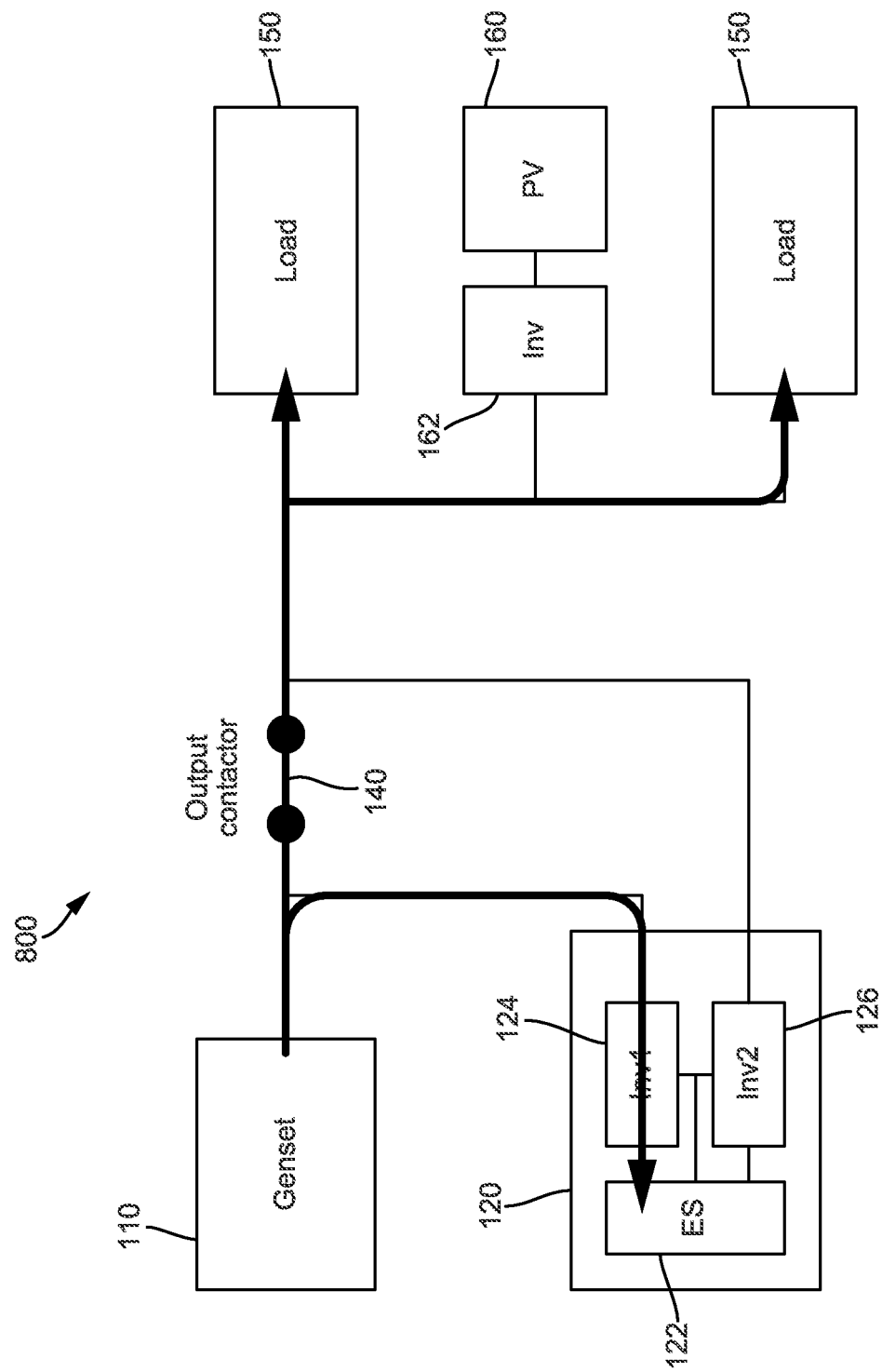
FIG. 8 is another configuration of the power generation system of FIG. 1 in which the genset is back to normal operation, according to an example embodiment.

Referring to FIG. 8, a configuration 800 of the power generation system 100 is shown in which the genset 110 is back to normal synchronous operation. In the configuration 800, the engine 112 is running at the rated speed (e.g., 1500 rpm for 50 Hz grid applications, or 1200 or 1800 rpm for 60 Hz applications, in some implementations). The controller 130 controls the voltage, frequency, and/or phase of the AC power output from the genset 110 to synchronize with those of the power grid 102, and puts the switch device 140 at the closed state so that the genset 110 is providing power to the power grid 102. The controller 130 can further operate the first inverter 124 to charge the energy storage device 122 to restore any stored power that was used. That is, the first inverter 124 acts as a rectifier that converts the AC power output from the genset 110 to DC power and charges the energy storage device 122 with the DC power.

Figure 9:
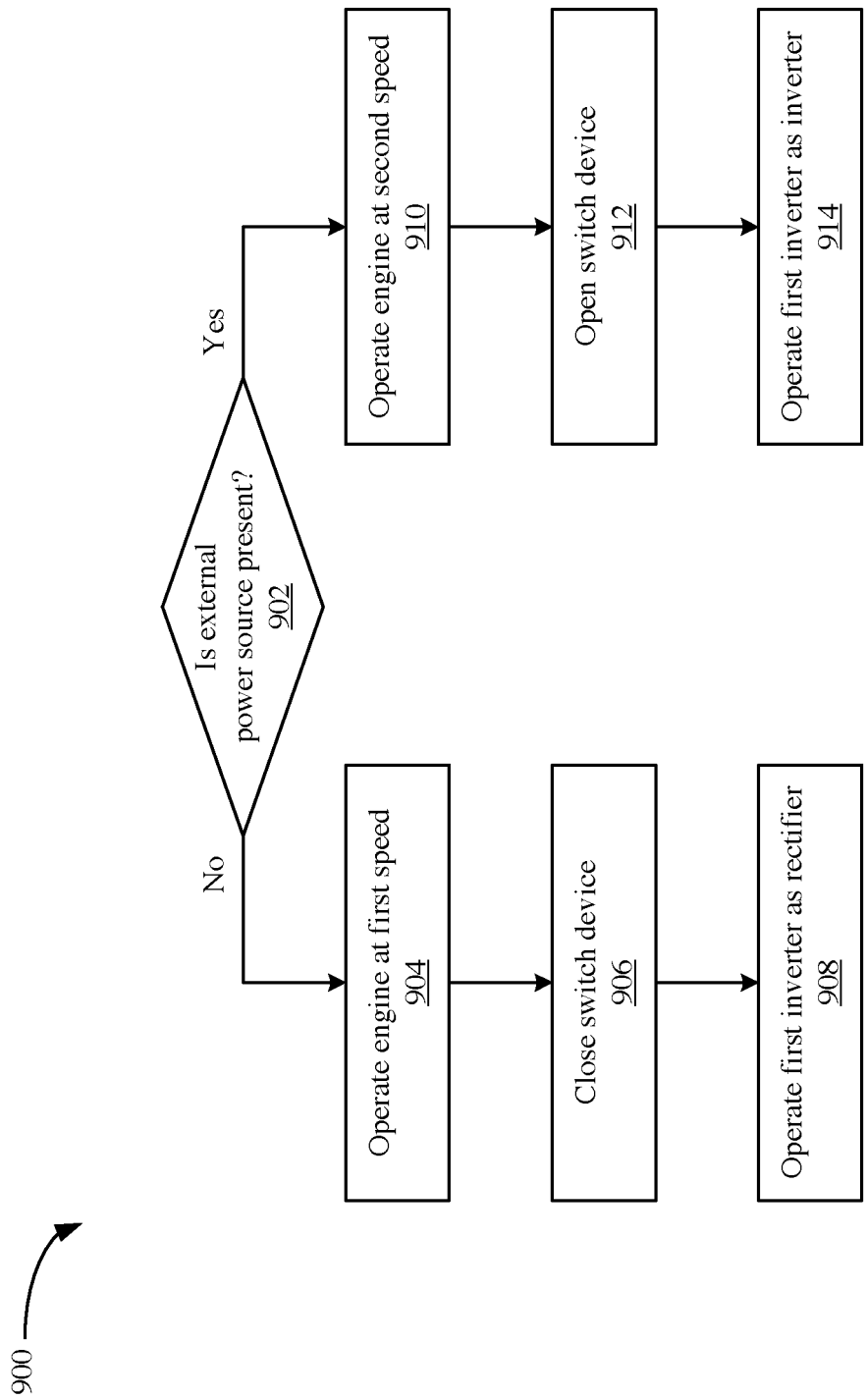
FIG. 9 is a flow diagram of a method for controlling the power generation system of FIG. 1, according to an example embodiment.

Referring now to FIG. 9, a flow diagram of a method 900 for controlling the power generation system 100 is shown, according to an example embodiment. The method 900 may be performed by the controller 130 in FIG. 1. The power generation system 100 comprises the genset 110 including the engine 112, the switch device 140 including the input terminal 142 connected to the genset 110 and the output terminal 144 structured to connect to the load 150. The power generation system 100 further comprises the electrical storage device 122, the first inverter 124 connected between the input terminal 142 and the electrical storage device 12, and a second inverter connected between the output terminal 144 and the electrical storage device 122. The controller 130 is communicably coupled to the genset 110, the switch device 140, the first inverter 124, the second inverter 126, and/or any other device or system to facilitate method 900 (e.g., of the power generation system 100).

At 902, the controller 130 determines whether the external power source 160 is providing power to the load 150. The controller 130 can determine the absence or presence of the power provided by the external power source 160 based on information received from the sensor 132. In some embodiments, the sensor 132 includes a voltage sensor configured to sense the voltage at the power grid 102, which may reflect the presence or absence of the external power source 160. For example, when there is a sudden reduction of the power provided by the external power source 160, the sensor 132 can sense a voltage dip at the power grid 102. When there is a sudden increase of the power provided by the external power source 160, the sensor 132 can sense a voltage surge at the power grid 102. In some embodiments, the sensor 132 may include other types of sensors, such as current sensor, load sensor, etc.

In response to determining that the external power source 160 is not providing power to the load 150 (902), the controller 130 operates the power generation system in a first state in which the engine 112 of the genset 110 operates at a first speed (904), the switch device 140 is closed to connect the genset 110 to the load 150 (906), and the electrical storage device 122 is recharged by the genset 110 through at least one of the first inverter 124 or the second inverter 126 (908). In some embodiments, the first speed is a rated speed, e.g., 1500 rpm for 50 Hz grid applications, or 1800 (or 1200) rpm for 60 Hz applications.

In some embodiments, in the first state, the controller 130 can determine that a transient state occurs and control the first inverter 124 and/or the second inverter 126 to recharge or discharge the energy storage device 122 in response to detecting the transient state. For example, when a large load is added, the controller 130 can operate the first inverter 124 and/or the second inverter 126 to convert the DC power drawn from the energy storage device 122 to AC power and supply the AC power to the load 150 to supplement the AC power output from the genset 110. When a large load is removed, the controller 130 can operate the first inverter 124 and/or the second inverter 126 to convert the excess AC power produced by the genset 110 to DC power and charge the energy storage device 122 with the DC power.

In response to determining that the external power source is providing power to the load at 902, the controller 130 operates the power generation system 100 in a second state in which the engine 112 operates at a second speed lower than the first speed (910), the switch device 140 is opened (912), and the genset 110 provides power to the load 150 through the first inverter 124 and the second inverter 126, wherein the first inverter 124 operates as a rectifier (914). The second speed may be a low fixed, a lower variable speed, or an idle speed of the engine, which is substantially lower than the rated speed. Thus, the direct AC output from the genset 110 does not match the grid applications. The controller 130 puts the switch device 140 at the open state and controls the genset 110 to supply power to the load 150 through the first inverter 124 and the second inverter 126. In particular, the controller 130 operates the first inverter 124 as a rectifier that converts the AC power output from the genset 110 to DC power and operates the second inverter 126 to convert the DC power into AC power. The AC power output from the second inverter 126 is synchronized with the AC voltage at the power grid 102 in terms of amplitude, frequency, and/or phase.

In some embodiments, the controller 130 can detect that the external power source 160 is being added to provide power to the load 160, and in response to detecting the presence, switch the power generation system 100 from the first state to the second state. In switching, the controller 130 reduces the speed of the engine from the first speed to the second speed, operates the first inverter 124 as a rectifier, and opens the switch device 140.

In some embodiments, the controller 130 can detect that the power provided by the external power source 160 reduces or disappears and in response to detecting the reduction or disappearance, switch the power generation system 100 from the second state to the first state. In switching, the controller 130 provides power from the electrical storage device 122 to the load 150 through the second inverter 126, increases the speed of the engine from the second speed to the first speed, and closes the switch device.

It should be understood that no claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

It should be understood that the controller 130 may include any number of circuits for completing the functions described herein. Further, it should be understood that the controller 150 may further control other activity beyond the scope of the present disclosure.

The controller 130 may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A power generation system comprising:
   a generator set including an engine;
   a switch device including an input terminal connected to the generator set and an output terminal structured to connect to a load;
   an electrical storage device;
   a first inverter connected between the input terminal of the switch device and the electrical storage device;
   a second inverter connected between the output terminal of the switch device and the electrical storage device; and
   a controller communicably coupled to the generator set, the switch device, the first inverter, and the second inverter, the controller configured to:
   determine whether an external power source is providing power to the load;
   in response to determining that the external power source is not providing power to the load, operate the power generation system in a first state in which:
   the engine of the generator set operates at a first speed;
   the switch device is closed to connect the generator set to the load; and
   the electrical storage device is charged by the generator set through at least one of the first inverter or the second inverter; and
   in response to determining that the external power source is providing power to the load, operate the power generation system in a second state in which:
   the engine operates at a second speed lower than the first speed;
   the switch device is opened; and
   the generator set provides power to the load through the first inverter and the second inverter, wherein the first inverter operates as a rectifier.

2. The power generation system of claim 1, wherein the controller is further configured to:
   detect that the external power source is being added to provide power to the load; and
   in response to detecting the external power source is being added, switch the power generation system from the first state to the second state by:
   reducing a speed of the engine of the generator set from the first speed to the second speed;
   operating the first inverter as a rectifier; and
   opening the switch device.

3. The power generation system of claim 1, wherein the controller is further configured to:
   detect that the external power source is being removed; and
   in response to detecting the external power source is being removed, switch the power generation system from the second state to the first state by:
   configuring the electrical storage device to provide power to the load;
   increasing a speed of the engine of the generator set from the second speed to the first speed; and
   closing the switch device.

4. The power generation system of claim 1, further comprising a sensing device communicably coupled to the controller, the sensing device configured to measure a voltage level at the output terminal of the switch device, the measured voltage level providing an indication of the external power source providing power to the load.

5. The power generation system of claim 1, wherein in response to determining that the external power source is not meeting a load demand while the power generation system is operated in the second state, the controller is configured to switch from the second state to the first state by:
   configuring the generator set to increase a speed of the engine to the first speed;
   providing power to the load from the generator set through the first inverter and the second inverter, wherein the first inverter is configured to operate as a rectifier and the second inverter is configured to synchronize the power with the load;
   in response to determining that the engine of the generator set is operating at the first speed, connecting the generator set to the load through the switch device; and
   operating the power generation system in the first state.

6. The power generation system of claim 1, wherein in response to determining that the external power source is meeting a load demand while the power generation system is operated in the first state, the controller is configured to switch from the first state to the second state by:
   disconnecting the generator set to the load with the switch device;
   providing a control input to the generator set to decrease engine speed to the second speed; and
   operating the power generation system in the second state.

7. The power generation system of claim 1, wherein the second state further comprises:
   charging the electrical storage device by the generator set.

8. The power generation system of claim 1, wherein the controller is further configured to operate the power generation system in an alternate mode when the engine of the generator set is off, the alternate mode comprising:
   determining an increased load demand or a decreased load demand; and in response to determining a decreased load demand, providing power from the external power source to the electrical storage device through the second inverter.

9. The power generation system of claim 8, wherein the generator set further comprises an alternator, and wherein the controller is further configured to perform the following in response to determining an increased load demand:
providing power to the load from the electrical storage device through the second inverter;
providing power to the alternator from the electrical storage device through the first inverter;
providing a control input to the generator set to start the engine; and
in response to determining that the engine of the generator set is operating at the first speed, connecting the generator set to the load through the switch device.

10. A controller for a power generation system, the controller communicably coupled to a generator set, a switch device, a first inverter, a second inverter, and an electrical storage device, the controller configured to:
determine whether an external power source is providing power to a load;
in response to determining that the external power source is not providing power to the load, operate the power generation system in a first state in which:
an engine of the generator set operates at a first speed;
the switch device is closed to connect the generator set to the load; and
the electrical storage device is charged by the generator set through at least one of the first inverter or the second inverter; and
in response to determining that the external power source is providing power to the load, operate the power generation system in a second state in which:
the engine operates at a second speed lower than the first speed;
the switch device is opened; and
the generator set provides power to the load through the first inverter and the second inverter, wherein the first inverter operates as a rectifier.

11. The controller of claim 10, wherein the controller is further configured to:
detect that the external power source is being added to provide power to the load; and
in response to detecting the external power source is being added, switch the power generation system from the first state to the second state by:
reducing a speed of the engine of the generator set from the first speed to the second speed;
operating the first inverter as a rectifier; and
opening the switch device.

12. The controller of claim 10, wherein the controller is further configured to:
detect that the external power source is being removed; and
in response to detecting the external power source is being removed, switch the power generation system from the second state to the first state by:
configuring the electrical storage device to provide power to the load;
increasing a speed of the engine of the generator set from the second speed to the first speed; and
closing the switch device.

13. The controller of claim 10, wherein in response to determining that the external power source is not meeting a load demand while the power generation system is operated in the second state, the controller is configured to switch from the second state to the first state by:
configuring the generator set to increase a speed of the engine to the first speed;
providing power to the load from the generator set through the first inverter and the second inverter, wherein the first inverter is configured to operate as a rectifier and the second inverter is configured to synchronize the power with the load;
in response to determining that the engine of the generator set is operating at the first speed, connecting the generator set to the load through the switch device; and
operating the power generation system in the first state.

14. The controller of claim 10, wherein in response to determining that the external power source is meeting a load demand while the power generation system is operated in the first state, the controller is configured to switch from the first state to the second state by:
disconnecting the generator set to the load with the switch device;
providing a control input to the generator set to decrease engine speed to the second speed; and
operating the power generation system in the second state.

15. The controller of claim 10, wherein the second state further comprises: charging the electrical storage device by the generator set.

16. The controller of claim 10, wherein the controller is further configured to operate the power generation system in an alternate mode when the engine of the generator set is off, the alternate mode comprising:
determining an increased load demand or a decreased load demand; and
in response to determining a decreased load demand, providing power from the external power source to the electrical storage device through the second inverter.

17. The controller of claim 16, wherein the generator set further comprises an alternator, and wherein the controller is further configured to perform the following in response to determining an increased load demand:
providing power to the load from the electrical storage device through the second inverter;
providing power to the alternator from the electrical storage device through the first inverter;
providing a control input to the generator set to start the engine; and
in response to determining that the engine of the generator set is operating at the first speed, connecting the generator set to the load through the switch device.

18. A method of operating a power generation system, the power generation system comprising a controller, a generator set, a switch device, a first inverter, a second inverter, and an electrical storage device, the method comprising:
determining, by the controller, whether an external power source is providing power to the load;
in response to determining that the external power source is not providing power to the load, operating, by the controller, the power generation system in a first state in which:
an engine of the generator set operates at a first speed;
the switch device is closed to connect the generator set to the load; and
the electrical storage device is charged by the generator set through at least one of the first inverter or the second inverter; and in response to determining that the external power source is providing power to the load, operating, by the controller, the power generation system in a second state in which:
- the engine operates at a second speed lower than the first speed;
- the switch device is opened; and
- the generator set provides power to the load through the first inverter and the second inverter, wherein the first inverter operates as a rectifier.

19. The method of claim 18, wherein the controller is further configured to:
- detect that the external power source is being added to provide power to the load; and
- in response to detecting the external power source is being added, switch the power generation system from the first state to the second state by:
  - reducing a speed of the engine of the generator set from the first speed to the second speed;
  - operating the first inverter as a rectifier; and
  - opening the switch device.

20. The method of claim 18, wherein the controller is further configured to:
- detect that the external power source is being removed; and
- in response to detecting the external power source is being removed, switch the power generation system from the second state to the first state by:
- configuring the electrical storage device to provide power to the load;
- increasing a speed of the engine of the generator set from the second speed to the first speed; and
- closing the switch device.

* * * * *